US012662068B2

(12) United States Patent
Wei et al.

(10) Patent No.: US 12,662,068 B2
(45) Date of Patent: Jun. 23, 2026

(54) WIRELESS CONTROL OF AUTOMOTIVE FEATURES

(71) Applicant: VISTEON GLOBAL TECHNOLOGIES, INC., Van Buren Township, MI (US)

(72) Inventors: Gang Wei, Novi, MI (US); Yogesh B. Patel, Johns Creek, GA (US); Antonio O. Odejerte, Superior Twp., MI (US)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 293 days.

(21) Appl. No.: 18/485,769

(22) Filed: Oct. 12, 2023

(65) Prior Publication Data

US 2024/0123925 A1     Apr. 18, 2024

Related U.S. Application Data

(60) Provisional application No. 63/416,472, filed on Oct. 14, 2022.

(51) Int. Cl.
B60R 16/023          (2006.01)
G06F 3/0484          (2022.01)
             (Continued)

(52) U.S. Cl.
CPC ........ B60R 16/0231 (2013.01); G06F 3/0484 (2013.01); G06F 3/0488 (2013.01);
             (Continued)

(58) Field of Classification Search
CPC .............. B60R 16/0231; G06F 3/0484; G06F 3/0488; G06F 3/14; G08C 17/02;
             (Continued)

(56) References Cited

U.S. PATENT DOCUMENTS 7,268,506 B2      9/2007  Nakagawa et al.
10,564,984 B2 *   2/2020  Honghalli Devaraju ...................
                                                          G06F 9/4403

(Continued)

OTHER PUBLICATIONS

B. Lakshmipraba (2015) Drive-by-Wireless System for Vehicle Control using Wireless Sensor-Actuator Network,International Journal of Inventions in Computer Science and Engineering, vol. 2 Issue 2 2015. (Year: 2015).*

*Primary Examiner* — Vivek D Koppikar
*Assistant Examiner* — Jeffrey Chalhoub
(74) *Attorney, Agent, or Firm* — Quinn IP Law

(57)          ABSTRACT

A system includes a graphical user interface display, a cockpit domain controller, and a wireless device. The graphical user interface display is operational to receive a plurality of input commands from an end user. The cockpit domain controller is in communication with the graphical user interface display, and is operational to transmit a plurality of wireless signals in response to the plurality of input commands received from the graphical user interface display. The wireless device is connectable to a controlled device, is in wireless communication with the cockpit domain controller, is operational to translate the plurality of wireless signals received from the cockpit domain controller into at least one of a motor control command and a switch control command, and is operational to present the at least one of the motor control command and the switch control command to the controlled device while connected.

20 Claims, 9 Drawing Sheets

(51) Int. Cl.

| | |
|---|---|
| *G06F 3/0488* | (2022.01) |
| *G06F 3/14* | (2006.01) |
| *G08C 17/02* | (2006.01) |
| *B60K 35/10* | (2024.01) |
| *B60K 35/80* | (2024.01) |

(52) U.S. Cl.
CPC ............... *G06F 3/14* (2013.01); *G08C 17/02* (2013.01); *B60K 35/10* (2024.01); *B60K 35/80* (2024.01); *B60K 2360/11* (2024.01); *B60K 2360/1438* (2024.01); *B60K 2360/56* (2024.01)

(58) Field of Classification Search
CPC ............... B60K 35/80; B60K 2360/56; B60K 2360/11; B60K 2360/1438; B60K 35/10
See application file for complete search history.

(56) References Cited

U.S. PATENT DOCUMENTS

| | | | |
|---|---|---|---|
| 2014/0363144 A1 | 12/2014 | Zhou et al. | |
| 2018/0099643 A1 | 4/2018 | Golsch et al. | |
| 2018/0253398 A1 | 9/2018 | Wu et al. | |
| 2018/0285121 A1 | 10/2018 | Lambert et al. | |
| 2021/0316700 A1* | 10/2021 | Bielby | ................ B60R 25/305 |
| 2022/0219666 A1 | 7/2022 | Nagata | |

* cited by examiner

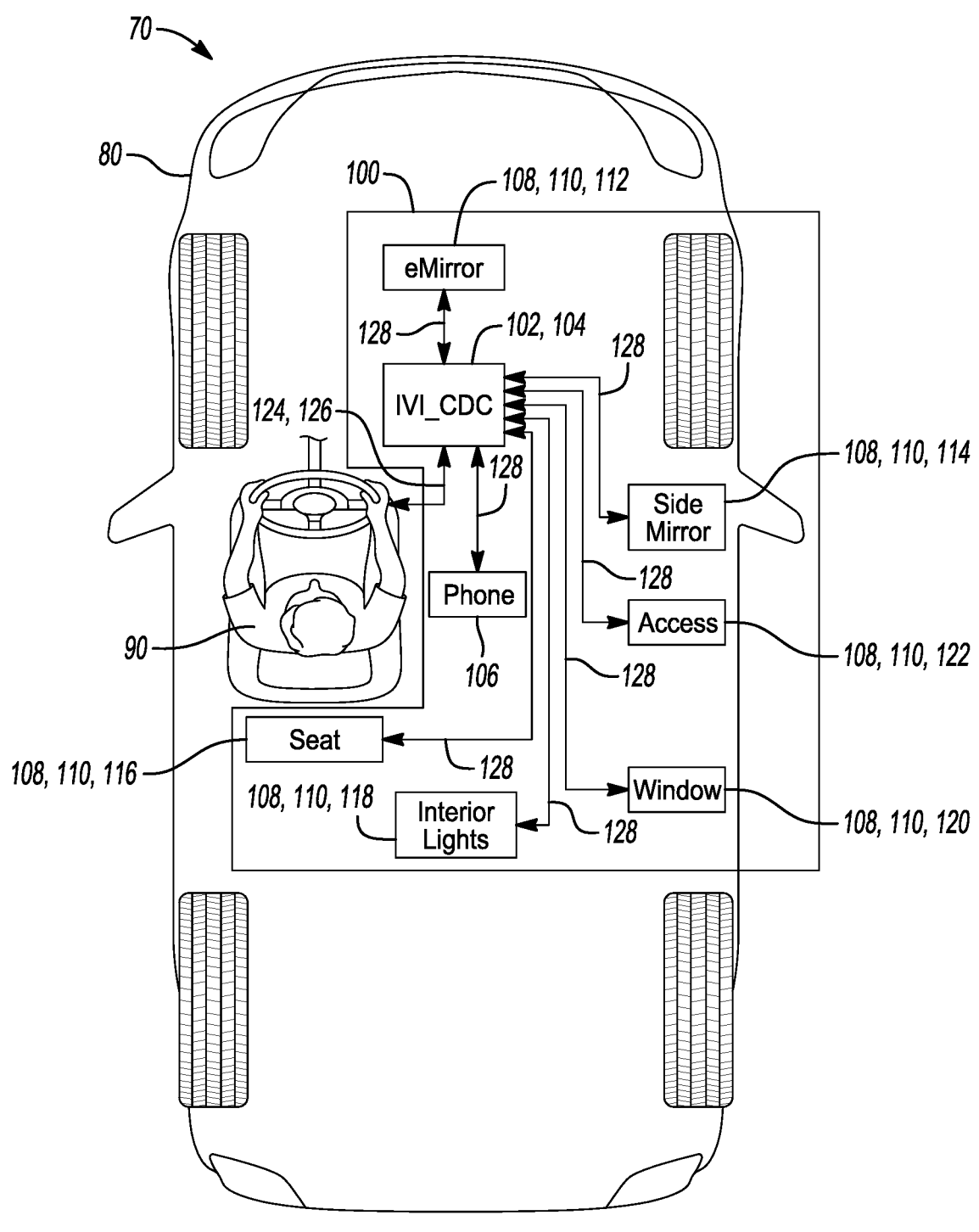
_Fig-1_

WIRELESS CONTROL OF AUTOMOTIVE FEATURES

CROSS-REFERENCE TO RELATED APPLICATIONS

This application claims the benefit of U.S. Provisional Application No. 63/416,472, filed Oct. 14, 2022, which is hereby incorporated by reference in its entirety.

TECHNICAL FIELD

The present disclosure generally relates to systems and methods for wireless control of automotive devices.

BACKGROUND

In current vehicle architectures, various features are controlled via physical switches that are mounted in strategical locations in the vehicle. The switches for the features are connected to motor driver circuitry either via hard wired interfaces or standard automotive interfaces such as local interconnect network (LIN) busses or controller area network (CAN) busses. The current implementations generally increase an overall weight of the vehicle due to wire harness and modules/switch assemblies, incur high labor cost during assembly, cause difficulties and higher labor cost during service to replace parts, and impact overall material costs for vehicle prices.

SUMMARY

A system is provided herein. The system includes a graphical user interface display, a cockpit domain controller, and a wireless device. The graphical user interface display is operational to receive a plurality of input commands from an end user. The cockpit domain controller is in communication with the graphical user interface display, and is operational to transmit a plurality of wireless signals in response to the plurality of input commands received from the graphical user interface display. The wireless device is connectable to a controlled device, is in wireless communication with the cockpit domain controller, is operational to translate the plurality of wireless signals received from the cockpit domain controller into at least one of a motor control command and a switch control command, and is operational to present the at least one of the motor control command and the switch control command to the controlled device while connected.

In one or more embodiments of the system, the graphical user interface display and the cockpit domain controller are a cellular telephone of the end user.

In one or more embodiments of the system, the cockpit domain controller is further operational to scan for the wireless device.

In one or more embodiments of the system, the wireless device is further operational to advertise an availability via the wireless communication with the cockpit domain controller.

In one or more embodiments of the system, the cockpit domain controller is further operational to authenticate the wireless device in response to the availability of the wireless device.

In one or more embodiments of the system, the cockpit domain controller is further operational to enter into a secure communication with the wireless device in response to a successful authentication.

In one or more embodiments of the system, the cockpit domain controller and the wireless device are further operational to communicate bidirectionally in a secure state in response to entering the secure communication.

In one or more embodiments of the system, the controlled device is one or more of a seat of the end user, a window, an interior light, a side mirror, an e-mirror, and a car access device.

In one or more embodiments, the system includes a system-on-chip in the cockpit domain controller. The system-on-chip is operational to exchange bidirectional information with the graphical user interface display. The system-on-chip has a first boot time. The system further includes a vehicle interface processor in the cockpit domain controller. The vehicle interface processor is operational to present basic video information on the graphical user interface display while the system-on-chip is booting up. The vehicle interface processor has a second boot time that is shorter than the first boot time.

A system is provided herein. The system includes a graphical user interface, a cockpit domain controller, and a wireless device. The graphical user interface display is operational to receive a plurality of input commands from an end user. The cockpit domain controller is in communication with the graphical user interface display, and is operational to transmit a plurality of wireless signals in response to the plurality of input commands received from the graphical user interface display. The wireless device is connectable to a controlled device, is in wireless communication with the cockpit domain controller, and is operational to translate the plurality of wireless signals received from the cockpit domain controller into at least one of a motor control command and a switch control command to the wireless device. The cockpit domain controller includes a system-on-chip operational to exchange bidirectional information with the graphical user interface display, and the system-on-chip has a first boot time, and a vehicle interface processor operational to present basic video information on the graphical user interface display while the system-on-chip is booting up, and the vehicle interface processor has a second boot time that is shorter than the first boot time.

In one or more embodiments of the system, the cockpit domain controller further includes a video bridge coupled to the system-on-chip and the vehicle interface processor, and operational to transfer advanced video information from the system-on-chip to the vehicle interface processor after the system-on-chip has booted up.

In one or more embodiments of the system, the cockpit domain controller further includes a touchscreen controller coupled to the system-on-chip and the graphical user interface display, and operational to transfer the plurality of input commands from the graphical user interface display to the system-on-chip.

In one or more embodiments of the system, the cockpit domain controller further includes a video switch coupled to the system-on-chip, the vehicle interface processor, and the graphical user interface display. The video switch is operational to transfer the basic video information from the vehicle interface processor to the graphical user interface display before the system-on-chip has booted up.

In one or more embodiments of the system, the video switch is further operational to transfer advanced video information from the system-on-chip to the graphical user interface display after the system-on-chip has booted up.

In one or more embodiments of the system, the cockpit domain controller further includes a touchscreen controller coupled to the system-on-chip and the graphical user interface display, and operational to transfer the plurality of input commands from the graphical user interface display to the system-on-chip.

In one or more embodiments of the system, the cockpit domain controller further includes a high speed communication interface circuit coupled between the system-on-chip and the graphical user interface display, operational to transfer the bidirectional information between the system-on-chip and the graphical user interface display after the system-on-chip has booted up, and operational to transfer advanced video information from the system-on-chip to the graphical user interface display.

In one or more embodiments of the system, the vehicle interface processor is directly connected to the graphical user interface display.

In one or more embodiments of the system, the graphical user interface display includes a touchscreen controller coupled to the high speed communication interface circuit, and operational to transfer the plurality of input commands from the graphical user interface display to the system-on-chip.

A system is provided herein. The system includes a first cellular telephone of a first user of a vehicle, and a wireless device. The first cellular telephone includes a first graphical user interface display operational to receive a plurality of first input commands from the first user, and a first cockpit domain controller in communication with the first graphical user interface display, and operational to transmit a plurality of first wireless signals in response to the plurality of first input commands received from the first graphical user interface display. The wireless device is connectable to a controlled device, is in wireless communication with the first cockpit domain controller, is operational to translate the plurality of first wireless signals received from the first cockpit domain controller into at least one of a motor control command and a switch control command, and is operational to present the at least one of the motor control command and the switch control command to the controlled device while connected.

In one or more embodiments, the system includes a second cellular telephone of a second user of the vehicle. The second cellular telephone includes a second graphical user interface display operational to receive a plurality of second input commands from the second user, and a second cockpit domain controller in communication with the second graphical user interface display, and operational to transmit a plurality of second wireless signals in response to the plurality of second input commands received from the second graphical user interface display. The wireless device is in wireless communication with the second cockpit domain controller, and is further operational to translate the plurality of second wireless signals received from the second cockpit domain controller into at least one of the motor control command and the switch control command, and is further operational to present the at least one of the motor control command and the switch control command to the controlled device while connected.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 illustrates a schematic plan diagram of an automotive context in accordance with one or more exemplary embodiments.

Figure 2:
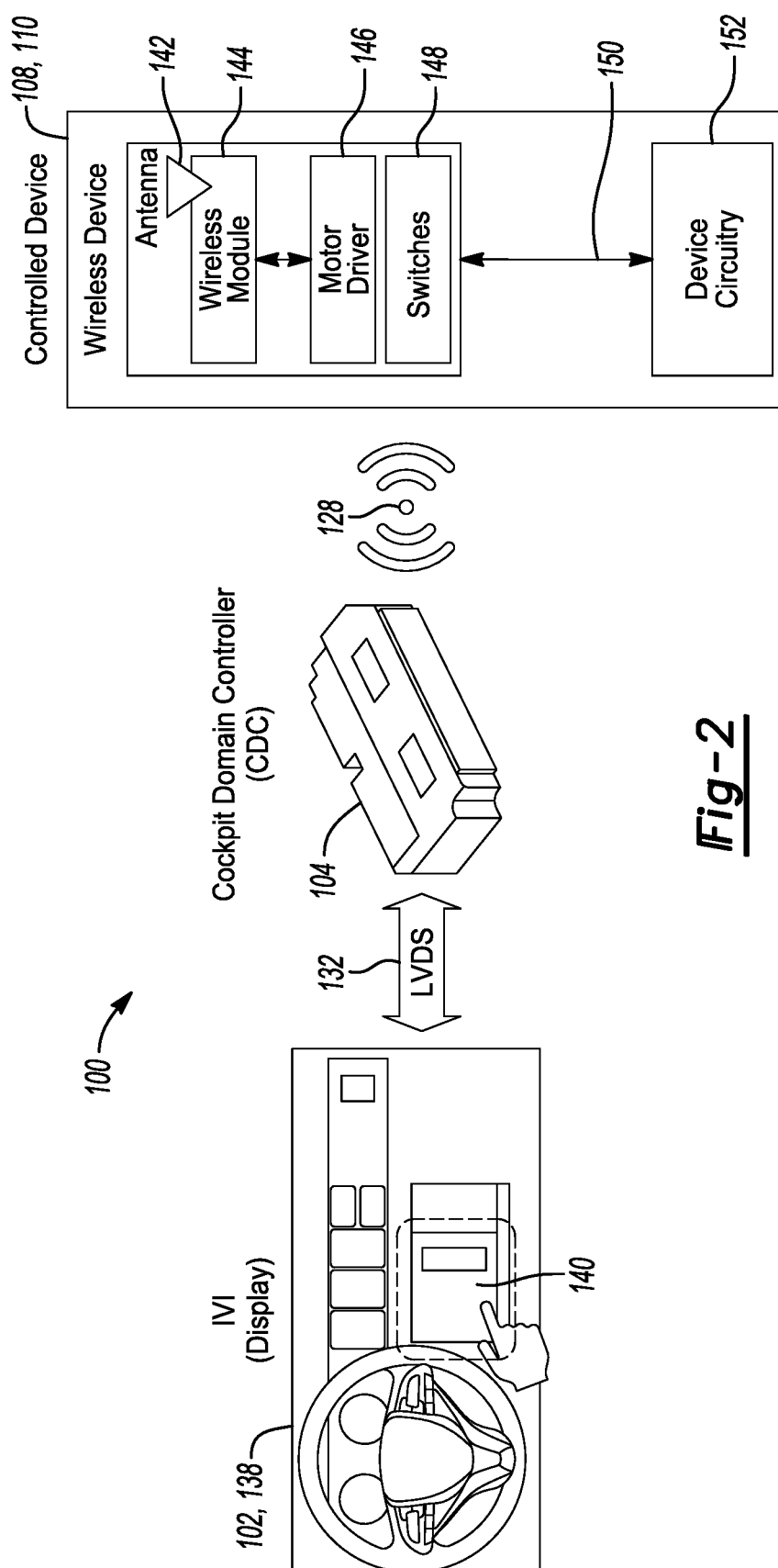
FIG. 2 illustrates a schematic diagram of wireless control of automotive features in accordance with one or more exemplary embodiments.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

Embodiments of the disclosure generally provide for a system and/or method for controlling features of an automotive vehicle. The features generally include, but are not limited to, movements of windows, side mirrors, rear view mirrors (e.g., e-mirrors), and seats. The features may include operation of interior lighting of the vehicle and remote-key car access (e.g., door lock control) using wireless communication. In various embodiments, an end user (e.g., a driver and/or passenger) uses a graphical user interface (GUI) display of the vehicle that is connected to a infotainment or a cockpit domain controller (CDC) box of the vehicle to control the operations/movements of the various automotive features. In other embodiments, the end user may use a handheld wireless device (e.g., a mobile telephone or cellular telephone) to provide direct control links to the automotive features. In still other embodiments, the end user may use the handheld wireless device to control the automotive features by relaying commands through the infotainment or the domain controller box.

The embodiments of the system and/or method generally address/solve space, weight, and/or cost issues by replacing wired interfaces (e.g., hard wire to switches and/or controller area network bus (CAN)/local interconnect network bus (LIN) interfaces) with the wireless communication. The graphical display interface and/or screens of the handheld devices may eliminate the physical switches for each controlled device (e.g., window control, lighting control, side mirror control, e-mirrors control, and seat control) by having a graphical display interface on the display that is connected to the infotainment/cockpit domain controller box.

The system generally includes the in-vehicle infotainment (IVI) system with a touchscreen display, the cockpit domain controller, and multiple wireless devices. A wireless device may be integrated into each controlled device. Each wireless device relays commands from the cockpit domain controller to device circuitry within the controlled devices. The wireless devices generally include a wireless module, a motor driver circuit, and a switches circuit. The device circuitry may include motors and/or relays that are connected to and controlled by the motor driver circuit and the switches circuit.

In various embodiments, the wireless device implements a chip-on-board device that provides the wireless module, the motor driver circuit and the switches circuit. Software executing in the in-vehicle infotainment system, the cockpit domain controller and/or the wireless devices enable the end user(s) with wireless control of the controlled devices. The wireless protocol generally includes, but is not limited to, BLE, Zigbee, Trend, and proprietary protocols. The system includes a universal wireless board design for the wireless devices that may be used easily with less testing and certification to be done by the integrator thereby minimizing development time and still develop the final product with high quality.

The system/method includes mobile applications (apps) executable in the handheld devices (e.g., mobile phones or cellular telephones) to control the movements and status of the windows, lightings, side mirrors, e-mirrors, seats, and car access in the vehicle. The mobile applications provide accessibility and control by the end user to the various features. With a possibility to control the features using a mobile phone, the end user may, for example, remotely close the windows using smart phone apps for situations wherein the vehicle owner forgot to close the windows when rain starts to pour down. The wireless device may also provide the end user a way to configure and/or set particular settings (e.g., side mirror positions and memory seat positions/orientations) of some features to conform with his/her preferences. Other features in the vehicle that are connected via controller area network bus/local interconnect network bus that may be controlled via a wireless device to save overall cost and reduce the vehicle weight in increase mileage.

FIG. 1 illustrates a schematic plan diagram of an automotive context 70 in accordance with one or more exemplary embodiments. The automotive context 70 generally comprises a vehicle 80, an end user (or person) 90, and a system 100. The system 100 generally includes an in-vehicle infotainment system 102, a cockpit domain controller 104, a phone 106, one or more wireless devices 108, and one or more controlled devices 110. The controlled devices 110 may include, but are not limited to, an e-mirror 112, multiple side mirrors 114 (one shown), multiple seats 116 (one shown), multiple interior lights 118 (one shown), multiple windows 120 (one shown), and multiple car access devices 122.

The vehicle 80 may include mobile vehicles such as automobiles, trucks, motorcycles, boats, trains and/or aircraft. In some embodiments, the vehicle 80 may be a stationary object. The stationary objects may include, but are not limited to, billboards, kiosks and/or marquees. Other types of vehicles 80 may be implemented to meet the design criteria of a particular application.

The end user 90 may be a driver of the vehicle 80. The end user 90 utilizes the in-vehicle infotainment system 102 to enter input commands 124 that selectively control the controlled devices 110. The end user 90 may receive feedback from the controlled devices 110 as output data 126 presented by the in-vehicle infotainment system 102.

The system 100 implements an in-vehicle wireless control system. The system 100 is operational to receive a input commands from an end user 90 via a graphical user interface display of the in-vehicle infotainment system 102, communication with the end user 90 via the graphical user interface display, transmit wireless signals 128 in response to the input commands 124 received from the graphical user interface display, receive the wireless signals 128 from the wireless devices 108, present output data 126 to the end user 90, translate the wireless signals 128 received at the wireless devices 108 from the cockpit domain controller 104 into at least one of a motor control command and a switch control command, and present the at least one of the motor control command and the switch control command from the wireless devices 108 to the controlled device 110 while connected.

The in-vehicle infotainment system 102 implements a graphical user interface to the end user 90. The in-vehicle infotainment system 102 is operational to receive the input commands 124 from the end user 90 and present the output data 126 to the end user 90. The in-vehicle infotainment system 102 is in bidirectional communication with the cockpit domain controller 104 to communicate with the rest of the system 100.

The cockpit domain controller 104 implements one or more processors. The cockpit domain controller 104 is operational to receive the input commands 124 from the in-vehicle infotainment system 102 and generate the wireless signal 128 that conveys the input commands 124 to the appropriate wireless devices 108 to control the corresponding controlled devices 110. The cockpit domain controller 104 is also operational to receive the wireless signal 128 from the wireless devices 108, extract the output data 126 from the wireless signals 128, and present the output data 126 to the in-vehicle infotainment system 102 for presentation to the end user 90.

Each phone 106 implements as smart phone. In various embodiments, the people in the vehicle 80 may have multiple phones 106. The phones 106 are operational as individual in-vehicle infotainment systems. The phones 106 may communicate with the cockpit domain controller 104 via radio-frequency signals 130. The radio-frequency signals 130 may include Wi-Fi signals and Bluetooth signals. Other radio-frequency signals may be implemented to meet the design criteria of a particular application.

The wireless devices 108 implement bidirectional radio-frequency communication devices. Each wireless device 108 is operational to communicate with the cockpit domain controller 104 and a corresponding controlled device 110. The wireless devices 108 receive the wireless signals 128, extract the input commands 124, and present the input commands 124 to the controlled devices 110. In various embodiments, the wireless devices may receive the output data 126 from the controlled devices 110, insert the output data 126 into the wireless signals 128, and transmit the wireless signals 128 back to the cockpit domain controller 104.

The e-mirror 112 implements an electronic rear view mirror/display. The e-mirror 112 is generally configured in a mirror (or first) mode to reflect rear light arriving from a rear direction of the vehicle 80 toward the end user 90. A control circuit of the e-mirror 112 may be configured to generate a reflectance value in the mirror mode in response to an ambient light intensity and a rear light intensity. The e-mirror 112 is generally configured in a display (or second) mode to generate and present visual information to the end user 90 at a variable luminance rate (or level). In the display mode, the e-mirror 112 may utilize the rear light intensity and the ambient light intensity to provide automatic luminance control of the visual information.

The side mirrors 114 implement motorized mirrors. The side mirrors 114 are operational to tilt up/down and swing left/right in response to the input commands 124 received via the wireless signals 128. In various embodiments, the side mirrors 114 may include illuminable symbols, such as blind-spot warning symbols, that may be command on/off by the input commands 124 received via the wireless signals 128.

The seats 116 implement motorized seats. The seats 116 are operational to tilt, move forward/back, and raise up/down in response to the input commands 124 received via the wireless signals 128. In various embodiments, the seats may include additional features, such as heating elements, that may be command on/off by the input commands 124 received via the wireless signals 128.

The interior lights 118 implement visual lights within a crew cabin of the vehicle 80. The interior lights 118 are operational to be commanded on/off in response to the input commands 124 received via the wireless signals 128.

The windows 120 implement power windows. The windows 120 are operational to move up/down in response to the input commands 124 received via the wireless signals 128. In various embodiments, the windows 120 may provide output data 126 to the wireless devices 108 in response to detection of obstacles and/or hard physical limits.

The car access devices 122 implement door locks. The car access devices 122 are operational to lock/unlock the car doors in response to the input commands 124 received via the wireless signals 128.

FIG. 2 illustrated a schematic diagram of wireless control of automotive features in accordance with one or more exemplary embodiments. With reference back to FIG. 1, the wireless control is implemented by the system 100. The figure generally illustrates the in-vehicle infotainment system 102, the cockpit domain controller 104, and a controlled device 110. The cockpit domain controller 104 is in wireless communication with the controlled device 110 via a wireless signal 128. A low-voltage differential signaling (LVDS) bus 132 provides bidirectional communication between the in-vehicle infotainment system 102 and the cockpit domain controller 104. The in-vehicle infotainment system 102 includes a touchscreen 140 on the graphical user interface display 138. The controlled devices 110 may include a wireless device 108 and a device circuitry 152. The wireless device 108 generally includes an antenna 142, a wireless module (or circuit) 144, a motor driver circuit 146, and a switches circuit 147. A parallel bus 150 provides bidirectional communication between the wireless device 108 and the device circuitry 152.

The wireless module 144 implements a bidirectional wireless transceiver. The wireless module 144 is operational to communicate with the cockpit domain controller 104 via the antenna 142 and the wireless signal 128.

The motor driver circuit 146 implements one or more power switches. The motor driver circuit 146 is operational to provide motor-level power signals to the device circuitry 152 via the parallel bus 150.

The switches circuit 148 implements one or more electrically-controlled switches and/or sensing circuits. The electrically-controlled switches are coupled to circuitry in the device circuitry 152 via the parallel bus 150. The electrically-controlled switches are operational to provide on/off control of the circuitry in the device circuitry 152. The sensing circuits are operational to detect open/closed contacts in the device circuitry 152.

The device circuitry 152 implements one or more collections of motors, circuitry, and/or contactors. The device circuitry 152 generally has a custom configuration based on a particular application within the vehicle 80. The device circuitry 152 may include zero or more motors used to move mechanical devise in the vehicle 80. For example, the motors may adjust a position of a seat 116. The device circuitry 152 may include zero or more circuits that are controllable by the switches circuit 148. For example, the circuits may include a relay (e.g., mechanical or solid-state) that switches on/off electrical power to an interior light 118. The device circuitry 152 may include zero or more contactors that may be sensed by the switches circuit 148. For example, the device circuitry 152 may be part of a car access device 122 to sense of a door lock is engaged or disengaged. Other designs of the device circuitry 152 may be implemented to meet the design criteria of a particular application.

Figure 3:
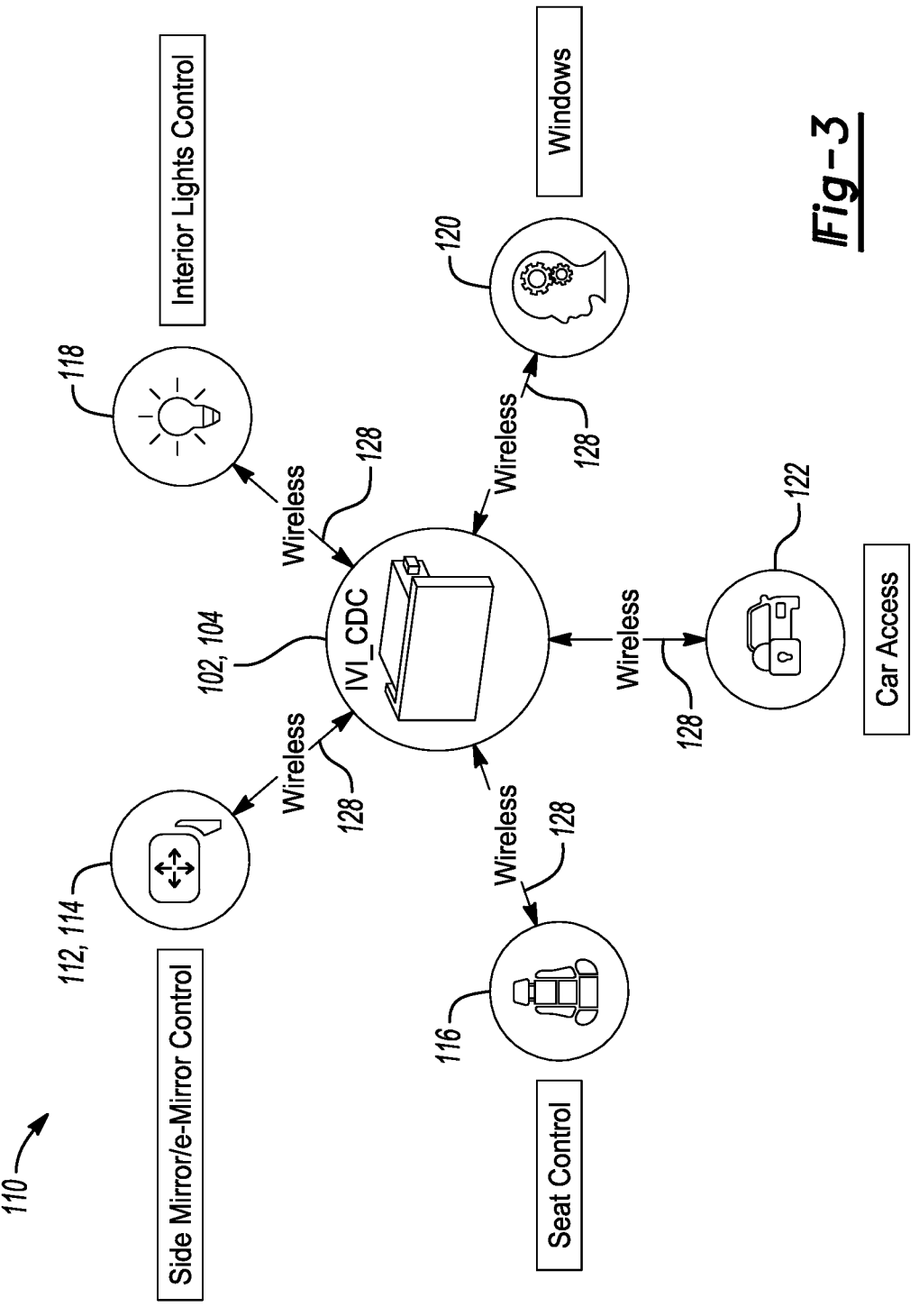
FIG. 3 illustrates a schematic diagram of controlled devices of the vehicle in accordance with one or more exemplary embodiments.

FIG. 3 illustrates a schematic diagram of controlled devices 110 of the vehicle 80 in accordance with one or more exemplary embodiments. The controlled devices 110 illustrated include an e-mirror 112, a side mirror 114, a seat 116, an interior light 118, a window 120, and a car access device 122. The controlled devices 110 communicate with the in-vehicle infotainment system 102 via the wireless signals 128 exchanged with the cockpit domain controller 104.

Figure 4:
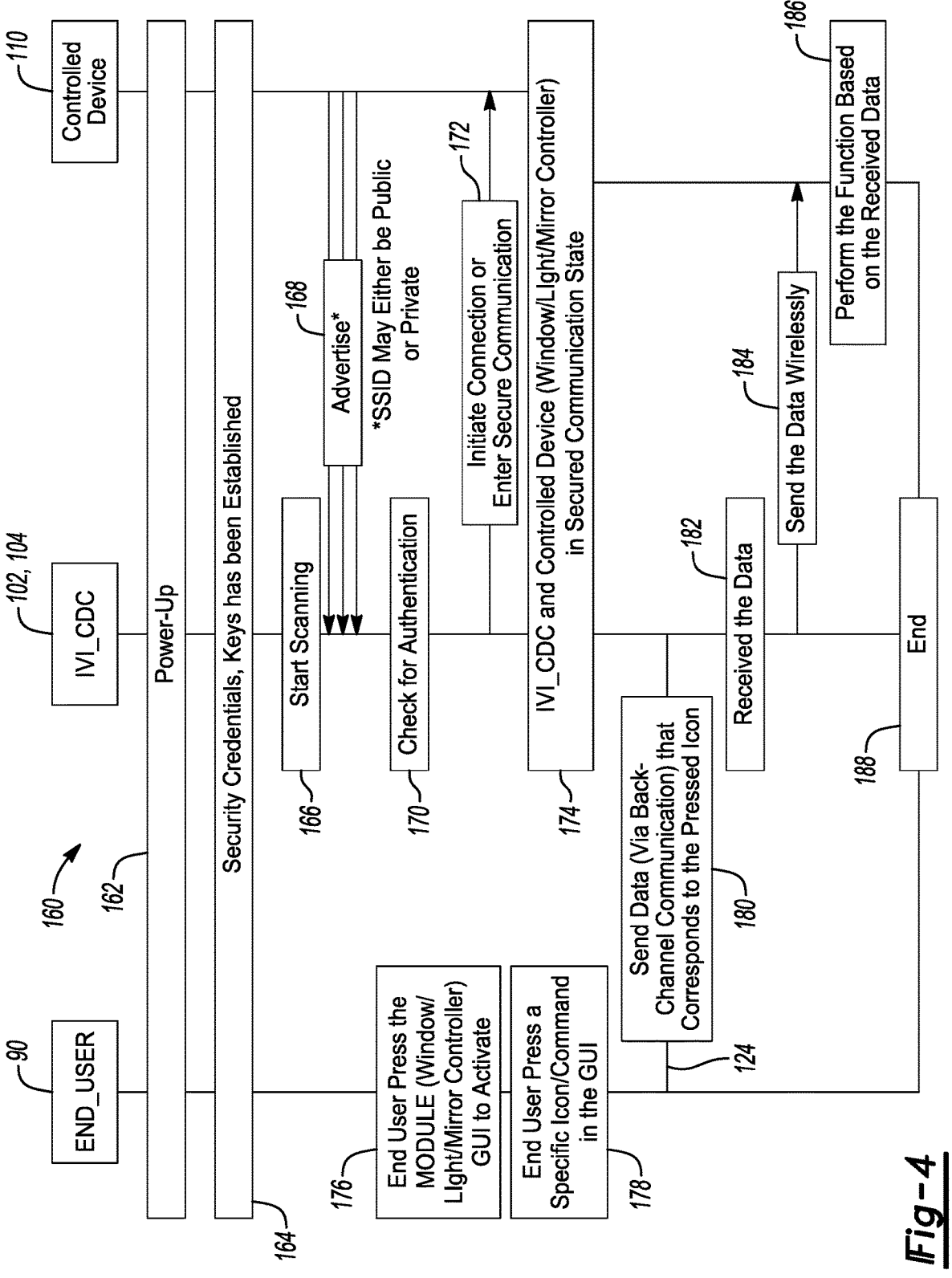
FIG. 4 illustrates a functional flow diagram of a first mode of the wireless control in accordance with one or more exemplary embodiments.

FIG. 4 illustrates a functional flow diagram of a first mode of the wireless control in accordance with one or more exemplary embodiments. The first mode 160 is implemented among the end user 90, the in-vehicle infotainment system 102, the cockpit domain controller 104 and a controlled device 110. The first mode 160 generally includes steps 162 to 188, as illustrated. The sequence of steps is shown as a representative example. Other step orders may be implemented to meet the criteria of a particular application.

In a step 162, the electronics within the vehicle 80 may powered up. Security credentials and keys are established among the in-vehicle infotainment system 102, the cockpit domain controller 104, and the controlled device 110 in the step 164. The cockpit domain controller 104 may start scanning in the step 166 for the controlled device 110.

In the step 168, the controlled device 110 may advertise an availability. A service set identifier (SSID) of the controlled device 110 may either be public or private depending on the original equipment manufacturer security criteria. The cockpit domain controller 104 checks for authentication of the controlled device 110 in the step 170. If authentication is successful, the cockpit domain controller 104 may initiate a connection to or enter a secure communication with the controlled device 110 in the step 172. Thereafter, in the step 174, the cockpit domain controller 104 and the controlled device 110 may be a secured communication state.

In the step 176, the end user 90 may select from a list of operations available on the touchscreen 140 and/or discrete switches of the in-vehicle infotainment system 102. The end user 90 may subsequently provide an input command 124 (e.g., press an icon on the touchscreen 140) to the in-vehicle infotainment system 102 to perform a particular operation in the step 178. The in-vehicle infotainment system 102 may send data in the step 180 to the cockpit domain controller 104 based on the input command 124. The cockpit domain controller 104 receives the data for the input command 124 in the step 182.

In the step 184, the cockpit domain controller 104 transmits the data via a wireless signal 128 to the controlled device 110. The controlled device 110 performs the function requested by the input command 124 in the step 186. The first mode 160 may subsequently end in the step 188.

Figure 5:
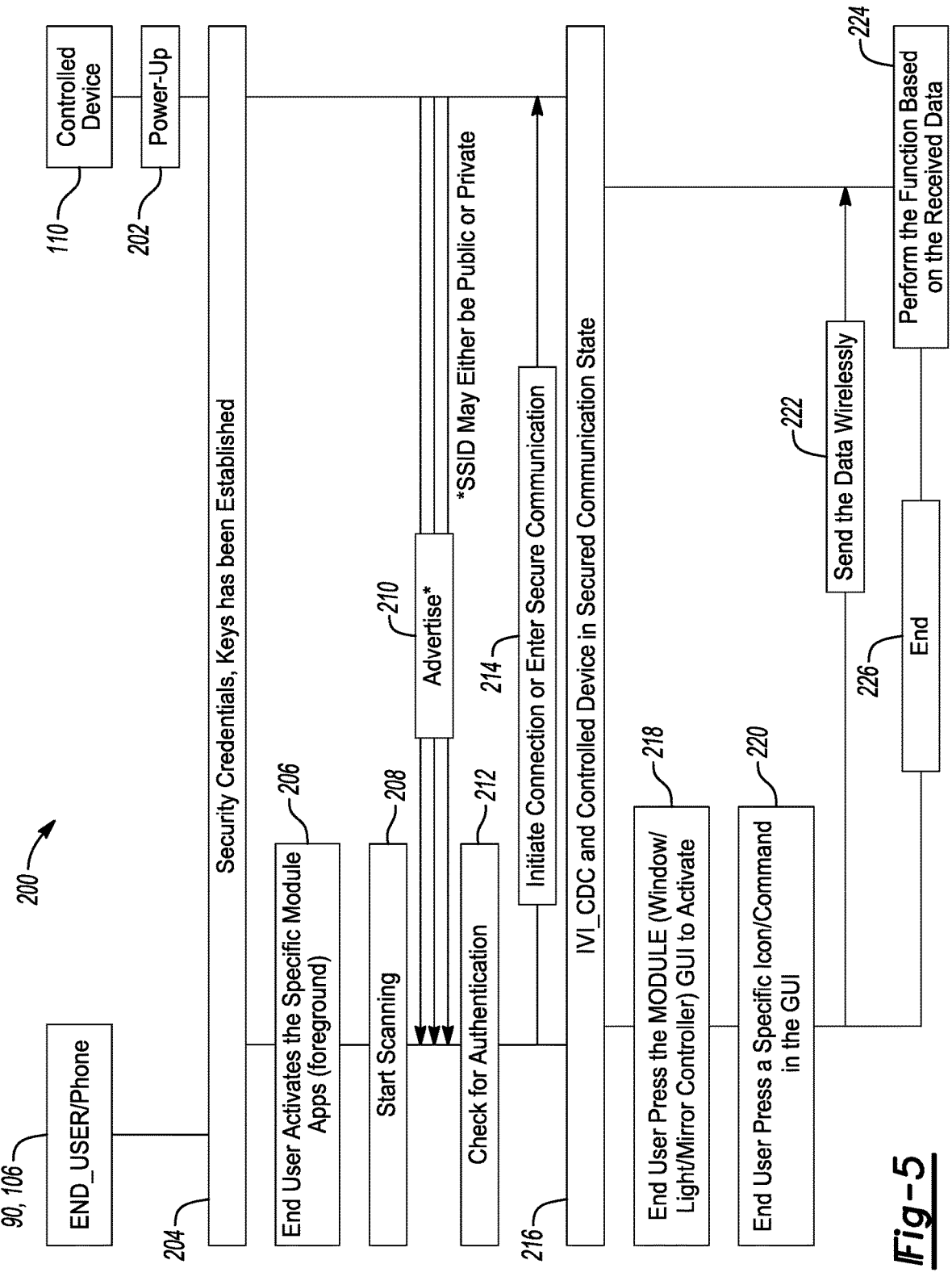
FIG. 5 illustrates a functional flow diagram of a second mode of the wireless control in accordance with one or more exemplary embodiments.

FIG. 5 illustrates a functional flow diagram of a second mode of the wireless control in accordance with one or more exemplary embodiments. The second mode 200 is implemented among the end user 90, a phone 106, and a controlled device 110. The second mode 200 generally includes steps 202 to 226, as illustrated. The sequence of steps is shown as a representative example. Other step orders may be implemented to meet the criteria of a particular application.

In a step 202, the controlled device 110 within the vehicle 80 may powered up. Security credentials and keys are established among the phone 106 and the controlled device 110 in the step 204.

In the step 206, the end user 90 may initiate an application (app) on the phone 106. The application generally programs the phone 106 to operate as both the in-vehicle infotainment system 102 and the cockpit domain controller 104. The phone 106 may start scanning in the step 208 for the controlled device 110.

In the step 210, the controlled device 110 may advertise an availability. A service set identifier (SSID) of the controlled device 110 may either be public or private depending on the original equipment manufacturer security criteria. The phone 106 checks for authentication of the controlled device 110 in the step 212. If authentication is successful, the phone 106 may initiate a connection to or enter a secure communication with the controlled device 110 in the step 214. Thereafter, in the step 216, the phone 106 and the controlled device 110 may be a secured communication state.

In the step 218, the end user 90 may select from a list of operations available on a touchscreen and/or discrete switches of the phone 106. The end user 90 may subsequently provide an input command 124 to the phone 106 to perform a particular operation in the step 220. The phone 106 sends data in the step 222 to the controlled device 110 via a wireless signal 128. The controlled device 110 performs the function requested by the input command 124 in the step 224. The second mode 200 may subsequently end in the step 226.

Figure 6:
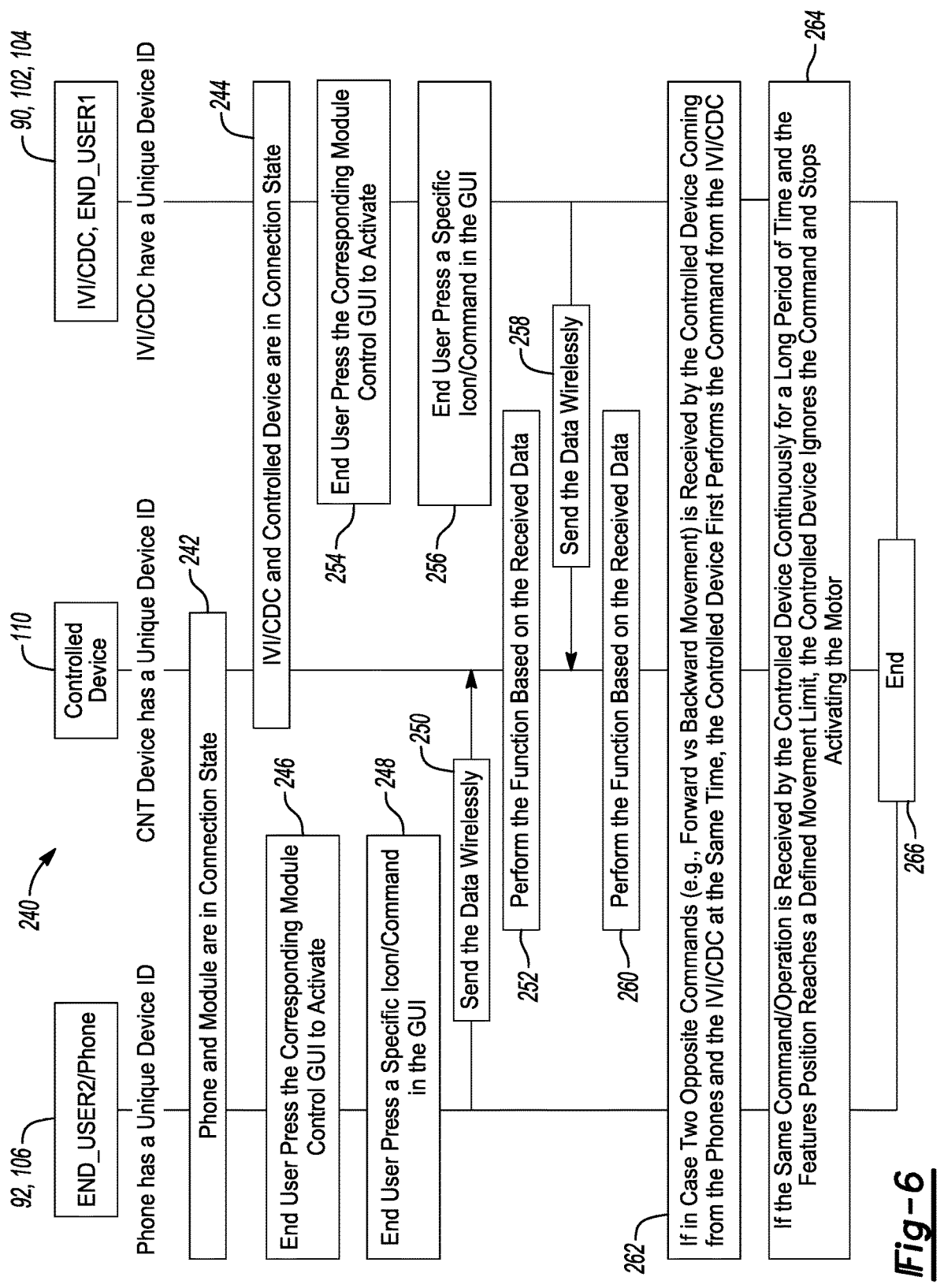
FIG. 6 illustrates a functional flow diagram of a third mode of the wireless control in accordance with one or more exemplary embodiments.

FIG. 6 illustrates a functional flow diagram of a third mode of the wireless control in accordance with one or more exemplary embodiments. The third mode 240 is implemented among a second end user 92, a phone 106, a controlled device 110, the in-vehicle infotainment system 102, the cockpit domain controller 104, and the end user 90. The third mode 240 generally includes steps 242 to 266, as illustrated. The sequence of steps is shown as a representative example. Other step orders may be implemented to meet the criteria of a particular application.

The phone 106, the controlled device 110, the in-vehicle infotainment system 102, and the cockpit domain controller 104 may each have a unique device identification. In the step 242, the phone 106 and the controlled device 110 are linked in a connected state (e.g., scan, advertise, authenticate and connect). The controlled device 110 and the cockpit domain controller 104 are also linked in a connected state in the step 244 (e.g., scan, advertise, authenticate and connect).

In the step 246, the second end user 92 may initiate an application (app) on the phone 106. The application generally programs the phone 106 to operate as both another in-vehicle infotainment system and another cockpit domain controller. The second end user 92 provides an input command 124 to the phone 106 to perform a particular operation in the step 248. The phone 106 sends data in the step 250 to the controlled device 110 via a wireless signal 128. The controlled device 110 performs the function requested by the second end user 92 in the step 252.

In the step 254, the end user 90 may select from a list of operations available on the touchscreen 140 and/or discrete switches of the in-vehicle infotainment system 102. The end user 90 may subsequently provide an input command 124 to the in-vehicle infotainment system 102 to perform a particular operation in the step 256. The in-vehicle infotainment system 102 may send data to the cockpit domain controller 104 based on the input command 124. The cockpit domain controller 104 receives the data for the input command 124 and transmits the input command 124 to the controlled device 110 in the step 258. The controlled device 110 performs the function requested by the end user 90 124 in the step 260.

In case the two functions requested by the end user 90 and the second end user 92 are opposite each other (e.g., conflict), the controlled device 110 may priorities and first perform the function commanded from the cockpit domain controller 104 (e.g., the end user 90) in the step 262. If the same requested operation is received by the controlled device 110 continuously for a long period of time (e.g., greater than 10 second), and the functions causes a feature to reach a defined movement limit, the controlled device 110 ignores the continuous request and stops activating the motor(s) in the step 264. The third mode 240 may subsequently end in the step 266.

Figure 7:
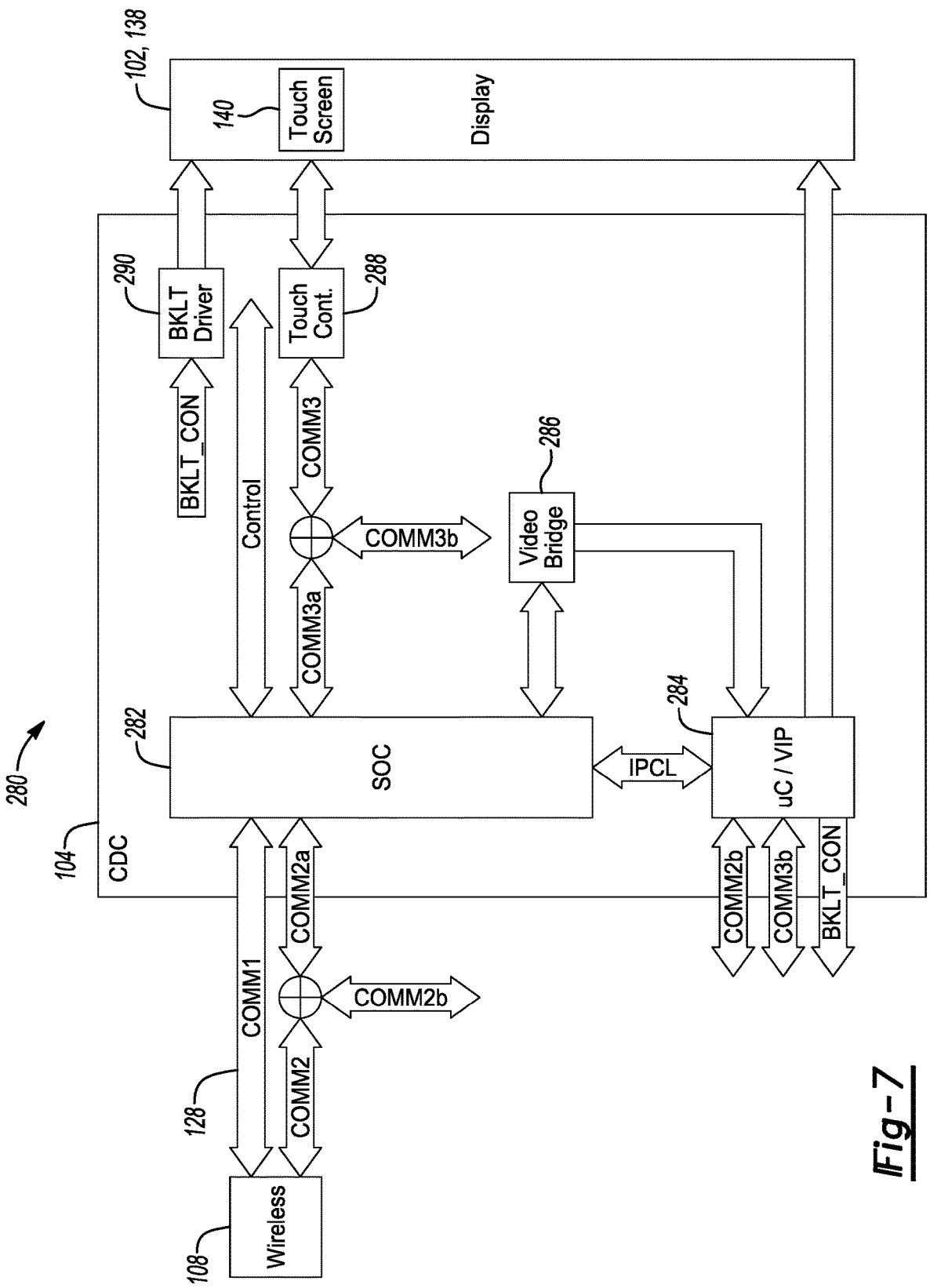
FIG. 7 illustrates a schematic diagram of a first architecture for the in-vehicle infotainment system and the cockpit domain controller.

FIG. 7 illustrates a schematic diagram of an example first architecture for the in-vehicle infotainment system and the cockpit domain controller is shown. The first architecture 280 generally includes a wireless device 108, the cockpit domain controller 104, and the graphical user interface display 138 of the in-vehicle infotainment system 102, and the touchscreen 140. The cockpit domain controller 104 may include a system-on-chip (SOC) 282, a vehicle interface processor (VIP) 284, a video bridge (or circuit) 286, a touchscreen controller 288, and a backlight driver circuit 290 (e.g., BKLT Driver).

In the first architecture 280, some of the communications of a wireless device 108 (e.g., COMM2) is logically OR connected with the system-on-chip 282 (e.g., COMM2a) and the vehicle interface processor 284 (e.g., COMM2b). A similar approach may be implemented for the touchscreen controller 288. Some of the communications of the touchscreen controller 288 (e.g., COMM3) is logically OR connected to the system-on-chip 282 (e.g., COMM3a) and the video bridge 286 (e.g., COMM3b). The video bridge 286 may be in communications with the system-on-chip 282 and the vehicle interface processor 284. The vehicle interface processor 284 may be in communications with the graphical user interface display 138.

The vehicle interface processor 284 typically receives a wake-up input signal (e.g. via controller area network bus interface) and boots up faster than the system-on-chip 282. The vehicle interface processor 284 may support basic video information like telltales, original equipment manufacturer (OEM) logo, and low dynamic graphical user interfaces shown on the graphical user interface display 138 while the system-on-chip 282 is still booting up. The vehicle interface processor 284 has a copy of a software stack for the wireless device 108 and the touchscreen controller 288 that may be used for the controlling seat movements, window movements, lightings, side mirror/e-mirrors, and the like.

When electrical power is applied to the in-vehicle infotainment system 102/the cockpit domain controller 104 and the graphical user interface display 138, or a wake-up signal is received by the in-vehicle infotainment system 102/the cockpit domain controller 104 and the graphical user interface display 138, then the wireless devices 108, the touchscreen controller 288, the touchscreen 140, the graphical user interface display 138, and the vehicle interface processor 284 start operating. During the time while the system-on-chip 282 is still booting up, the graphical user interface display 138 related to the features that are control via the in-vehicle infotainment system 102, the cockpit domain controller 104, and the graphical user interface display 138 are available in a short time (e.g., <10 seconds). With such an approach, the end user 90 may control the seat movement/memory recall, window movements, lightings, side mirror adjustments, and the like, while the system-on-chip 282 is still booting up (e.g., >15 seconds). Once the system-on-chip 282 is fully booted up, control to the touchscreen controller 288, the wireless devices 108, and the graphical user interface display 138 communication is moved from the vehicle interface processor 284 to the system-on-chip 282. The system-on-chip 282 may subsequently generate and present advanced video information on the graphical user interface display 138.

If a controller (e.g., an Intellitec programmable logic controller—IPLC) implemented between the system-on-chip 282 and the vehicle interface processor 284 supports high bandwidth (e.g., peripheral component interconnect express—PCIe) and a specified bandwidth of the wireless devices 108 is supported, control of the wireless devices 108 and the touchscreen controller 288 may be implemented by the vehicle interface processor 284.

Figure 8:
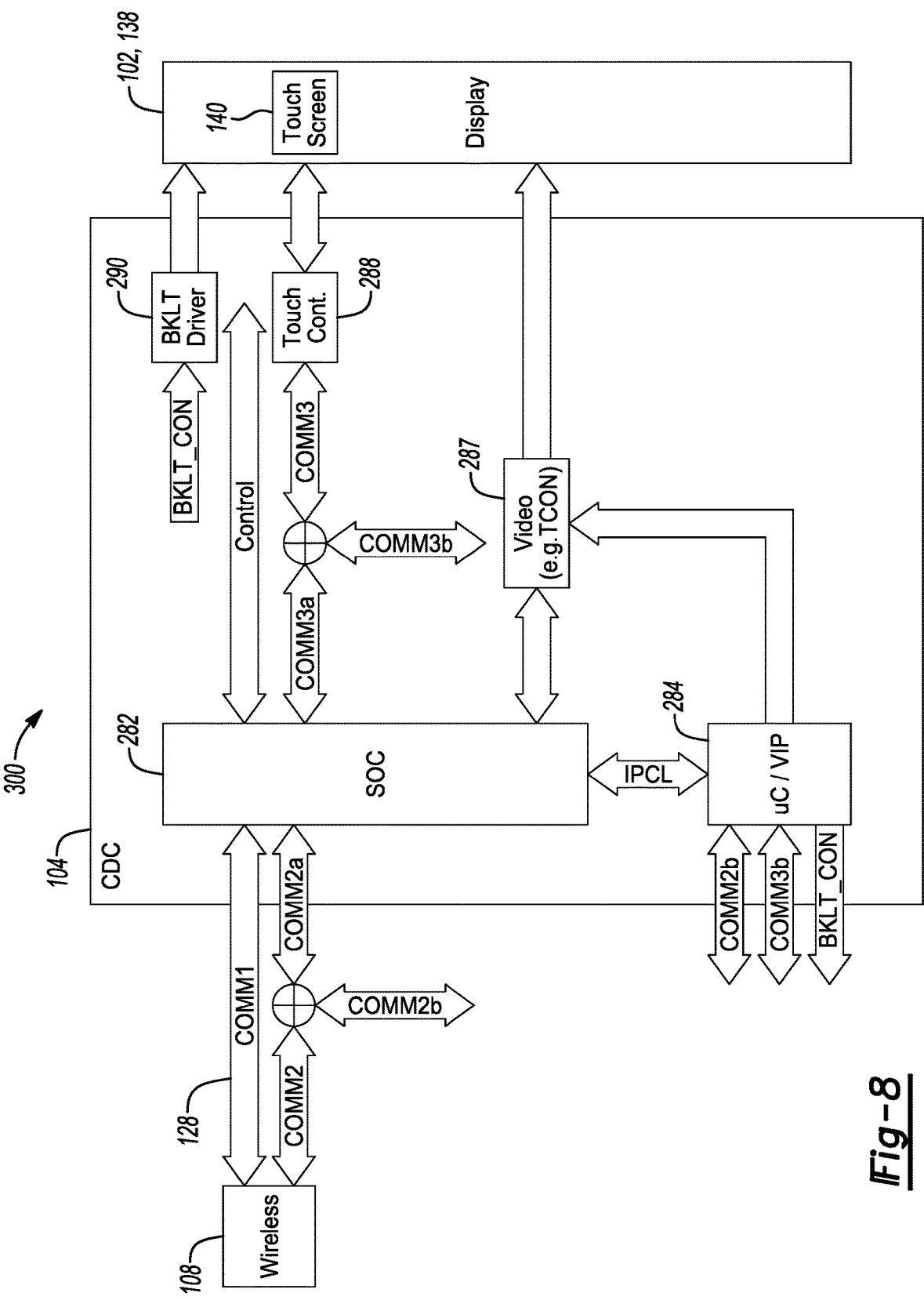
FIG. 8 illustrates a schematic diagram of a second architecture for the infotainment/cockpit domain controller.

FIG. 8 illustrates a schematic diagram of an example second architecture for the infotainment/cockpit domain controller is shown. In the second architecture 300, the vehicle interface processor 284 is a low-cost vehicle interface processor. The video control logical operations while the system-on-chip 282 is still booting up may be handled by the vehicle interface processor 284. Some of the communications coming of the wireless devices 108 is logically OR connected to the system-on-chip 282 and the vehicle interface processor 284. A similar approach may be implemented for the touchscreen controller 288.

The vehicle interface processor 284 typically receives a wake-up input signal (e.g. via controller area network bus interface) and boots up faster than the system-on-chip 282. The vehicle interface processor 284 may support the basic video information like telltales, original equipment manufacturer logo, and low dynamic graphical user interfaces shown on the graphical user interface display 138 while the system-on-chip 282 is still booting up. The vehicle interface processor 284 has a copy of a software stack for the wireless devices 108 and the touchscreen controller 288 that may be used for controlling seat movements, window movements, lightings, side mirror/e-mirrors, and the like.

When electrical power is applied to the in-vehicle infotainment system 102/the cockpit domain controller 104 and the graphical user interface display 138, or a wake-up signal is received by the in-vehicle infotainment system 102/the cockpit domain controller 104 and the graphical user interface display 138, then the wireless devices 108, the touchscreen controller 288, the touchscreen 140, the graphical user interface display 138, the vehicle interface processor 284, and the video switch 287 start operating. During the time while the system-on-chip 282 is still booting up, the graphical user interface related to the feature that are control via the in-vehicle infotainment system 102, the cockpit domain controller 104, and the graphical user interface display 138 are available in a short time (e.g., <10 seconds). With such an approach, the end user 90 may control the seat movement/memory recall, window movements, lightings, side mirror adjustments, and the like, while the system-on-chip 282 is still booting up (e.g., >15 seconds). Once the system-on-chip 282 is fully booted up, control to the touchscreen controller 288, the wireless devices 108 and the graphical user interface display 138 communication is moved by the video switch 287 from the vehicle interface processor 284 to the system-on-chip 282. The system-on-chip 282 may subsequently generate and present advanced video information on the graphical user interface display 138.

If a controller (e.g., an Intellitec programmable logic controller—IPLC) implemented between the system-on-chip 282 and the vehicle interface processor 284 supports high bandwidth (e.g. peripheral component interconnect express—PCIe) and a specified bandwidth of the wireless devices 108 is supported, control of the wireless devices 108 and the touchscreen controller 288 may be implemented by the vehicle interface processor 284.

Figure 9:
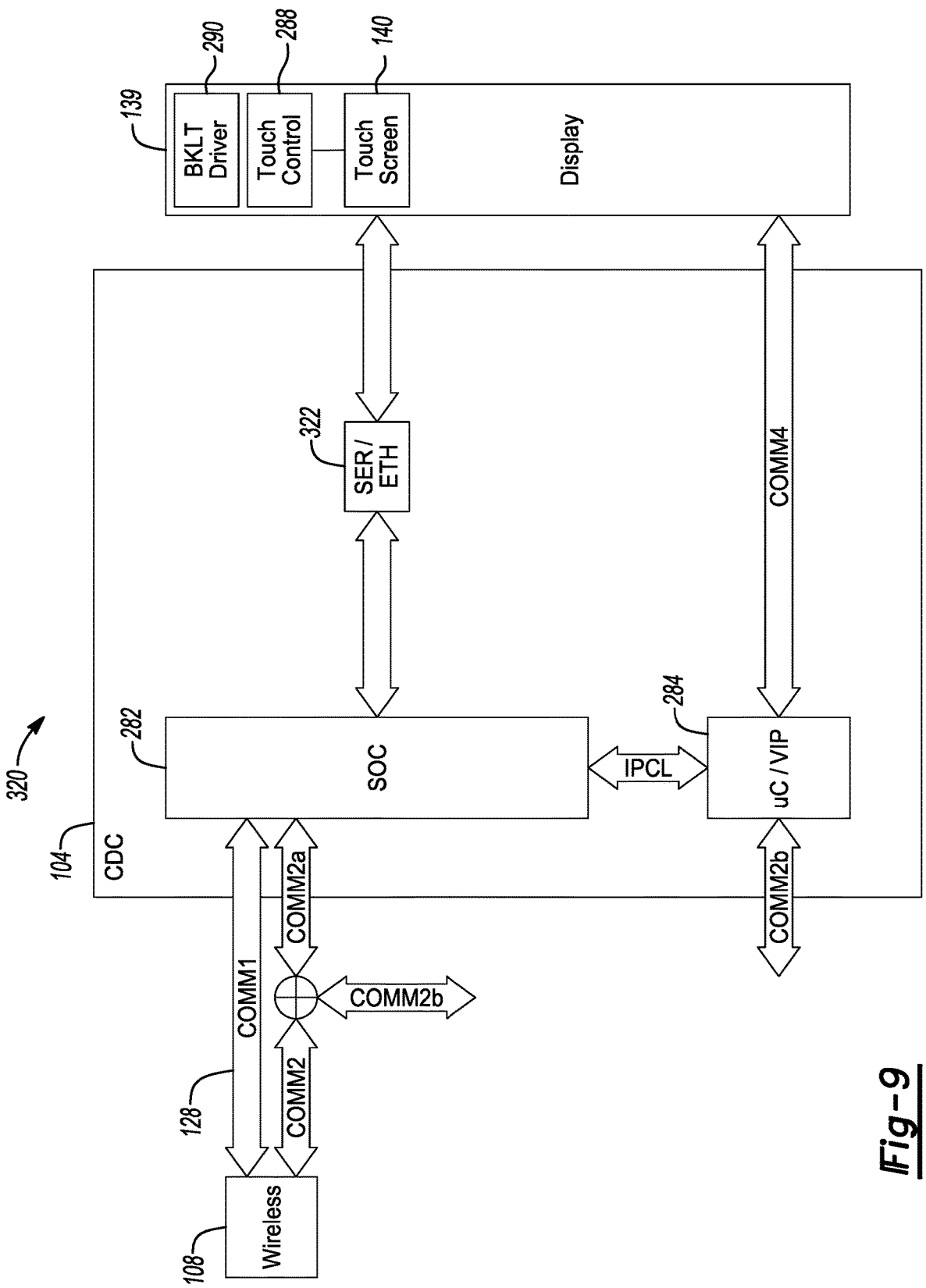
FIG. 9 illustrates a schematic diagram of a third architecture for the infotainment/cockpit domain controller.

FIG. 9 illustrates a schematic diagram of an example third architecture for the infotainment/cockpit domain controller is shown. The third architecture 320 is a disassociated topology wherein a graphical user interface display 139 is not integrated to the in-vehicle infotainment system 102/cockpit domain controller 104 product. The third architecture 320 may include a high speed communication interface circuit 322 (e.g., serial to Ethernet or serial-to-parallel converter) directly connected between the system-on-chip 282 and the graphical user interface display 139. The high speed communication interface circuit 322 is operational to transfer the bidirectional information between the system-on-chip 282 and the graphical user interface display 139 after the system-on-chip 282 has booted up, and operational to transfer the advanced video information from the system-on-chip 282 to the graphical user interface display 139.

Some of the communications coming of the wireless devices 108 is logically OR connected to the system-on-chip 282 and the vehicle interface processor 284. The backlight driver circuit 290 and the touchscreen controller 288 are integrated into the graphical user interface display 139. Therefore, the in-vehicle infotainment system 102/cockpit domain controller 104 has a communication interface (e.g. COMM4) to control or send command related to a display wake-up including activation of the backlight driver circuit 290 and the touchscreen controller 288. The graphical user interface display 139 generally implements either a "dumb" display or smart display.

The vehicle interface processor 284 typically receives a wake-up input signal (e.g. via controller area network bus interface) and boots up faster than the system-on-chip 282. The vehicle interface processor 284 is directly connected to the graphical user interface display 139 (e.g., COMM4). The vehicle interface processor may support the basic video information like telltales, original equipment manufacturer logo, and low dynamic graphical user interfaces shown on the graphical user interface display 139 while the system-on-chip 282 is still booting up. The vehicle interface processor 284 has a copy of a software stack for the wireless devices 108 and the touchscreen controller 288 that may be used for the controlling seat movements, window movements, lightings, side mirror/e-mirrors, and the like.

When electrical power is applied to the in-vehicle infotainment system 102/the cockpit domain controller 104 and the graphical user interface display 139, or a wake-up signal is received by the in-vehicle infotainment system 102/the cockpit domain controller 104, and the graphical user interface display 139, then the wireless devices 108, the touchscreen controller 288, the touchscreen 140, the graphical user interface display 139, and the vehicle interface processor 284 start operating. During the time while the system-on-chip 282 is still booting up, the graphical user interface related to the features that are control via the in-vehicle infotainment system 102, the cockpit domain controller 104, and the graphical user interface display 139 are available in a short time (e.g., <10 seconds). With such an approach, the end user 90 may control the seat movement/memory recall, window movements, lightings, side mirror adjustments, and the like, while the system-on-chip 282 is still booting up (e.g., >15 seconds). Once the system-on-chip 282 is fully booted up, control of the touchscreen controller 288, the wireless devices 108, and the graphical user interface display 139 communication is moved from the vehicle interface processor 284 to the system-on-chip 282. The system-on-chip 282 may subsequently generate and present advanced video information on the graphical user interface display 139.

If a controller (e.g., an Intellitec programmable logic controller— IPLC) implemented between the system-on-chip 282 and the vehicle interface processor 284 supports high bandwidth (e.g., peripheral component interconnect express— PCIe) and a specified bandwidth of the wireless devices 108 is supported, control of the wireless devices 108 and the touchscreen controller 288 may be implemented by the vehicle interface processor 284.

Those having ordinary skill in the art will recognize that terms such as "above," "below," "front," "back," "upward," "downward," "top," "bottom," etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the appended claims.

The invention claimed is:

1. A system comprising:
    a graphical user interface display operational to receive a plurality of input commands from an end user;
    a cockpit domain controller in communication with the graphical user interface display, and operational to transmit a plurality of wireless signals in response to the plurality of input commands received from the graphical user interface display, wherein the cockpit domain controller includes:
        a system-on-chip operational to exchange bidirectional information with the graphical user interface display, and the system-on-chip has a first boot time;
        a vehicle interface processor operational to transmit basic video information to the graphical user interface display independently of the system-on-chip while the system-on-chip is booting up, and the vehicle interface processor has a second boot time that is shorter than the first boot time; and
        a video switch coupled to the system-on-chip, the vehicle interface processor, and the graphical user interface display, wherein the video switch is operational to transfer the basic video information from the vehicle interface processor to the graphical user interface display before the system-on-chip has booted up, and transfer advanced video information from the system-on-chip to the graphical user interface display after the system-on-chip has booted up; and
    a wireless device connectable to a plurality of controlled devices, in wireless communication with the cockpit domain controller, operational to translate the plurality of wireless signals received from the cockpit domain controller into a motor control command and a switch control command, and operational to present the motor control command and the switch control command to the plurality of controlled devices while connected.

2. The system according to claim 1, wherein the graphical user interface display and the cockpit domain controller are a cellular telephone of the end user.

3. The system according to claim 1, wherein the cockpit domain controller is further operational to scan for the wireless device.

4. The system according to claim 3, wherein the wireless device is further operational to advertise an availability via the wireless communication with the cockpit domain controller.

5. The system according to claim 4, wherein the cockpit domain controller is further operational to authenticate the wireless device in response to the availability of the wireless device.

6. The system according to claim 5, wherein the cockpit domain controller is further operational to enter into a secure communication with the wireless device in response to a successful authentication.

7. The system according to claim 6, wherein the cockpit domain controller and the wireless device are further operational to communicate bidirectionally in a secure state in response to entering the secure communication.

8. The system according to claim 1, wherein the plurality of controlled devices is two or more of a seat of the end user, a window, an interior light, a side mirror, an e-mirror, and a car access device.

9. A system comprising:
    a graphical user interface display operational to receive a plurality of input commands from an end user;
    a cockpit domain controller in communication with the graphical user interface display, and operational to transmit a plurality of wireless signals in response to the plurality of input commands received from the graphical user interface display; and
    a wireless device connectable to a controlled device, in wireless communication with the cockpit domain controller, and operational to translate the plurality of wireless signals received from the cockpit domain controller into at least one of a motor control command and a switch control command to the controlled device;
    wherein the cockpit domain controller includes:
        a system-on-chip operational to exchange bidirectional information with the graphical user interface display, and the system-on-chip has a first boot time;
        a vehicle interface processor operational to transmit basic video information to the graphical user interface display independently of the system-on-chip while the system-on-chip is booting up, and the vehicle interface processor has a second boot time that is shorter than the first boot time; and
        a video switch coupled to the system-on-chip, the vehicle interface processor, and the graphical user interface display, and operational to transfer the basic video information from the vehicle interface processor to the graphical user interface display before the system-on-chip has booted up, and transfer advanced video information from the system-on-chip to the graphical user interface display after the system-on-chip has booted up.

10. The system according to claim 9, wherein the cockpit domain controller further comprises:

a touchscreen controller implemented with hardware, coupled to the system-on-chip and the graphical user interface display, and operational to transfer the plurality of input commands from the graphical user interface display to the system-on-chip.

11. The system according to claim 9, wherein the cockpit domain controller further comprises:

a high speed communication interface circuit coupled between the system-on-chip and the graphical user interface display, and operational to transfer the bidirectional information between the system-on-chip and the graphical user interface display after the system-on-chip has booted up.

12. The system according to claim 11, wherein the vehicle interface processor is directly connected to the graphical user interface display.

13. The system according to claim 11, wherein the graphical user interface display comprises:

a touchscreen controller coupled to the high speed communication interface circuit, and operational to transfer the plurality of input commands from the graphical user interface display to the system-on-chip.

14. A system comprising:

a first cellular telephone of a first user of a vehicle, wherein the first cellular telephone includes:

a first graphical user interface display operational to receive a plurality of first input commands from the first user; and a first cockpit domain controller in communication with the first graphical user interface display, and operational to transmit a plurality of first wireless signals in response to the plurality of first input commands received from the first graphical user interface display, wherein the first cockpit domain controller includes:

a system-on-chip operational to exchange bidirectional information with the graphical user interface display, and the system-on-chip has a first boot time;

a vehicle interface processor operational to transmit basic video information to the graphical user interface display independently of the system-on-chip while the system-on-chip is booting up, and the vehicle interface processor has a second boot time that is shorter than the first boot time; and a video switch coupled to the system-on-chip, the vehicle interface processor, and the first graphical user interface display, wherein the video switch is operational to transfer the basic video information from the vehicle interface processor to the first graphical user interface display before the system-on-chip has booted up, and transfer advanced video information from the system-on-chip to the first graphical user interface display after the system-on-chip has booted up; and a wireless device connectable to a controlled device, in wireless communication with the first cockpit domain controller, operational to translate the plurality of first wireless signals received from the first cockpit domain controller into at least one of a motor control command and a switch control command, and operational to present the at least one of the motor control command and the switch control command to the controlled device while connected.

15. The system according to claim 14, further comprising:

a second cellular telephone of a second user of the vehicle, wherein the second cellular telephone includes:

a second graphical user interface display operational to receive a plurality of second input commands from the second user; and a second cockpit domain controller in communication with the second graphical user interface display, and operational to transmit a plurality of second wireless signals in response to the plurality of second input commands received from the second graphical user interface display; wherein the wireless device is in wireless communication with the second cockpit domain controller, and further operational to translate the plurality of second wireless signals received from the second cockpit domain controller into at least one of the motor control command and the switch control command, and further operational to present the at least one of the motor control command and the switch control command to the controlled device while connected.

16. The system according to claim 9, wherein the graphical user interface display and the cockpit domain controller are a cellular telephone of the end user.

17. The system according to claim 9, wherein the cockpit domain controller is further operational to scan for the wireless device.

18. The system according to claim 17, wherein the wireless device is further operational to advertise an availability via the wireless communication with the cockpit domain controller.

19. The system according to claim 18, wherein the cockpit domain controller is further operational to authenticate the wireless device in response to the availability of the wireless device.

20. The system according to claim 19, wherein the cockpit domain controller is further operational to enter into a secure communication with the wireless device in response to a successful authentication.

* * * * *